(12) United States Patent
Stoffel et al.

(10) Patent No.: US 7,597,464 B2
(45) Date of Patent: Oct. 6, 2009

(54) TAIL LIGHT BRACKET ASSEMBLY

(75) Inventors: Chris Stoffel, Powell, OH (US); Nick Massaro, Dublin, OH (US); Patrick Shafer, Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/236,850

(22) Filed: Sep. 24, 2008

(65) Prior Publication Data
US 2009/0016071 A1    Jan. 15, 2009

Related U.S. Application Data

(63) Continuation-in-part of application No. 11/470,476, filed on Sep. 6, 2006.

(51) Int. Cl.
*B60Q 1/00*    (2006.01)
(52) U.S. Cl. ........................ 362/505; 362/549; 362/370; 362/396; 248/200; 293/117
(58) Field of Classification Search ................. 362/365, 362/370, 396, 505, 549; 248/200; 293/117
See application file for complete search history.

(56) References Cited

U.S. PATENT DOCUMENTS

| 5,277,006 | A | 1/1994 | Ruster |
| 5,743,497 | A | 4/1998 | Michael |
| 6,315,489 | B1 | 11/2001 | Watanabe |
| 6,724,637 | B2 | 4/2004 | Li et al. |
| 7,401,957 | B2 * | 7/2008 | Kroll ........................... 362/505 |
| 2005/0121561 | A1 | 6/2005 | Sweigard |
| 2008/0054134 | A1 * | 3/2008 | Shafer ......................... 248/200 |

* cited by examiner

*Primary Examiner*—Stephen F Husar
(74) *Attorney, Agent, or Firm*—Rankin, Hill & Clark LLP; Wesly A. Alig

(57) ABSTRACT

A bracket for controlling the gap between a light housing and bumper on a vehicle, the bracket is provided that includes a first generally flat surface defined by a first bracket leg, a series of second surfaces defined by the first bracket leg and raised above the first surface. The bracket also provides one or more first dual engagement clips supported on the first surface of the first bracket leg to clip a vehicle bumper to the bracket and one or more hooks each supported on a second surface of the first bracket leg allowing engagement of the light housing and bracket. The bracket allows a small uniform gap to be provided between the light housing and bumper and allows the light housing to be removed without removal of the bumper.

9 Claims, 7 Drawing Sheets

TAIL LIGHT BRACKET ASSEMBLY

This application is a Continuation-in-Part of U.S. patent application Ser. No. 11/470,476 filed on Sep. 6, 2006, which is currently pending.

BACKGROUND OF THE INVENTION

1. Field of the Invention

This invention relates to brackets, more particularly to brackets used for spacing apart adjacent parts on an automobile.

2. Description of Related Art

To provide pleasing aesthetics on an automobile, it is important that adjoining parts or assemblies, that are visible, are spaced uniformly from one another. Often, as is the case with a bumper on newer vehicles and an adjacent body panel, the transition between the two parts should appear as seamless as possible. Although avoiding the use of a seam is not feasible, having a small and uniformly spaced gap between the two parts draws little attention to the seam. Additionally, when multiple parts of the same type are attached to a vehicle in different areas, consistent spacing between each part and its adjacent panel, or bumper, etc. is desired. Consistency in spacing also avoids drawing attention to the seam between the adjacent parts.

One example of a type of part used in two positions on a vehicle that requires both a uniform gap and consistent spacing between the part and, in this case, the vehicle bumper, are rear tail light housings in rear tail light assemblies. Additionally, each tail light housing must be removable to allow for the replacement of light bulbs held therein. As a typical practice, before either the bumper or light housing is mechanically fastened to the vehicle body, a spacing bracket is mechanically fastened to the light housing. The light housing is then mechanically fastened to the vehicle body, and subsequently, the spacing bracket is mechanically fastened to the vehicle body. The bumper is then slid onto tabs on the spacing bracket, the bracket providing the desired spacing between the light housing and the bumper. Finally, the bumper is mechanically fastened to the vehicle body in the spaced position dictated by the bracket. In this first method, because the spacing bracket is mechanically fastened to the light housing, if the light housing needs to be removed for bulb replacement, the bumper must first be removed from the vehicle so the bracket can be removed along with, or unfastened from, the light housing. This is not desirable.

In an effort to remove this inconvenience, an alternate method of attachment has been used wherein any mechanical joint between the light housing and the bracket is discontinued. The light housing is first mechanically fastened to the vehicle body. Then, in contrast to the first method, the bracket is also mechanically fastened or welded to the vehicle body without being fastened to the light housing or using the light housing as a guide. The bumper is positioned on the vehicle body using the tabs on the bracket as a guide, and then is mechanically fastened to the vehicle body. This method of assembly and attachment, allows the light housing to be easily removed, however, requires an increased assembly tolerance for the gap between the light housing and bumper, typically resulting in a larger or inconsistent gap and seam.

What is desired is a method in which a small and consistent gap between a bumper and light housing is maintained by initially locating the spacer bracket on the light housing, but wherein later removal of the light housing may be performed without dismantling other parts of the vehicle.

BRIEF SUMMARY OF THE INVENTION

The present invention provides an improvement over the prior art by providing a tail light housing bracket that is clipped, but not mechanically fastened, to the light housing of a vehicle. The bracket and light housing then may be both mechanically fastened to the vehicle body in spaced positions, dictated by the bracket. The bumper is then clipped to the bracket and positioned with respect to the light housing. Finally, the bumper is mechanically fastened to the vehicle. In a second embodiment of the bracket, attachment of the bracket to the vehicle, directly, is not required.

In a first embodiment, the bracket includes clips that are supported on a surface of a first leg, the clips being used for attachment to the bumper. The bracket also includes, on a second leg, a mounting surface that facilitates attachment of the bracket to the vehicle body. The bracket also includes additional clips supported on second surfaces of the first leg that are raised with respect to the first surface of the first leg. The additional clips are used to attach the bracket to the light housing. Thus, the bracket provides clips at two heights on a common leg. The clips can be disengaged from the light housing by the application of force to the light housing to allow removal without having to remove other parts, such as the bumper, or having to remove the bracket itself.

In a second embodiment, the second leg is shortened and not attached to the vehicle body. The first set of clips is changed, providing a dual engagement function, clipping to both an interior and exterior edge of a portion of the bumper that defines a window therein. The additional clips are replaced with hooks for sliding engagement.

These and other aspects of the invention are herein described in particularized detail with reference to the accompanying figures.

DETAILED DESCRIPTION OF THE INVENTION

Figure 1:
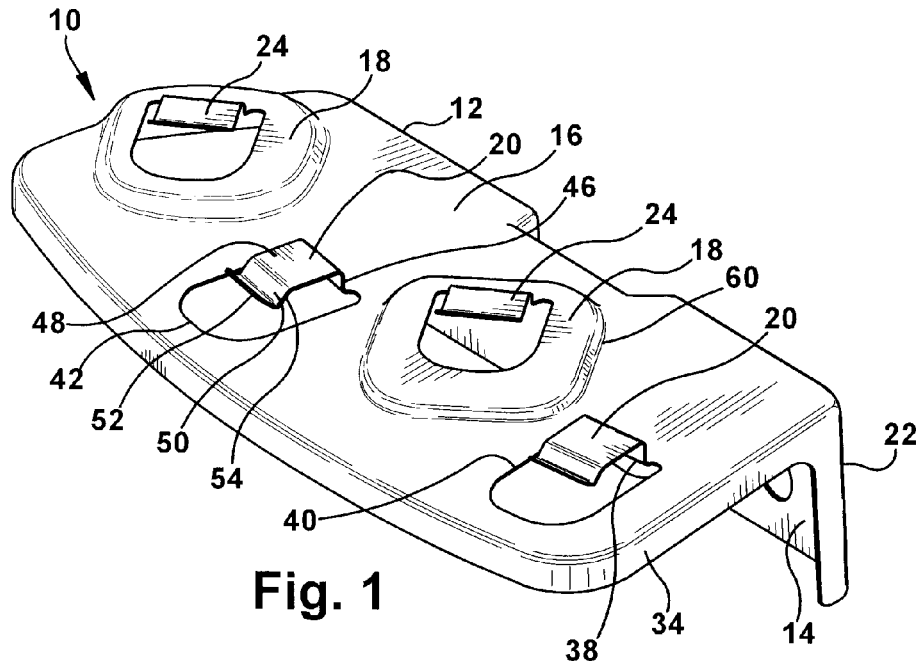
FIG. 1 is a perspective view of the bracket of the present invention.

Referring to the drawings, specifically FIG. 1, a preferred tail light bracket 10 according to the present invention is illustrated. As described in more detail below, the bracket 10 includes a first leg 12 and a second leg 14. The first leg 12 defines a first surface 16 two second surfaces 18 that are raised above the first surface 16. Two first clips 20 are supported on the first surface 16 of the first leg 12. A second clip 24 is supported on each second surface 18 of the first leg 12. The second leg 14 defines a mounting surface 22.

Figure 2:
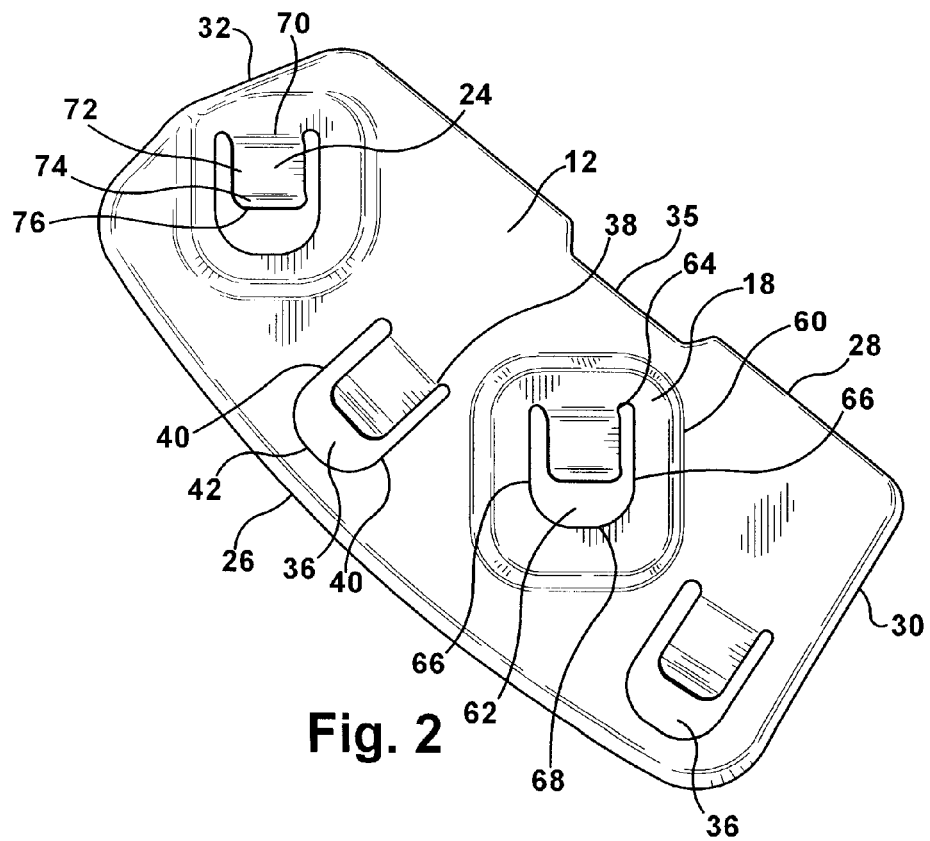
FIG. 2 is a top view of the bracket of the present invention.
Figure 4:
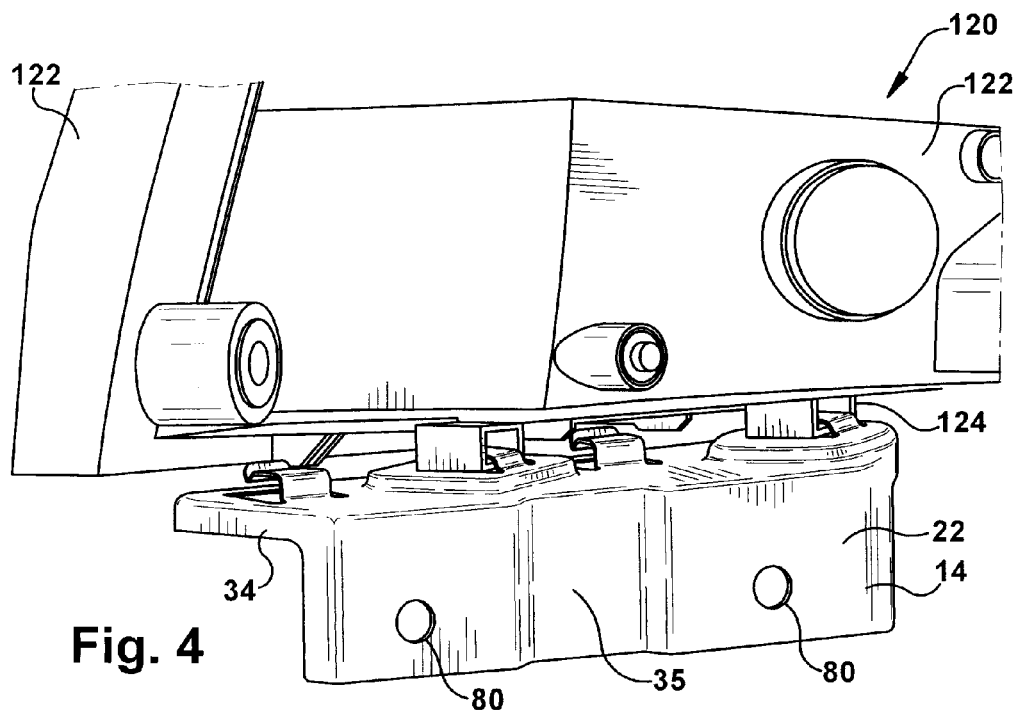
FIG. 4 is a perspective view of the bracket clipped to a vehicle tail light housing.

Referring to FIGS. 1, 2 and 4, the bracket 10 is shown with the first leg 12 integrally formed with the second leg 14. The first leg 12 is generally perpendicular to the second leg 14. The first leg 12, is generally rectangular and includes first and second edges 26 and 28 along the length of the first leg 12 and third and fourth edges 30 and 32 along the width of the first leg. A lip 34 is provided around the first, third and fourth edges 26, 30, 32 of the first leg 12 but not around the second edge 28 where the first leg 12 joins with the second leg 14. The lip 34 extends from the first leg 12 in the same direction as the second leg 14. The first leg 12 further defines the first, generally flat, surface 16. The first leg 12 includes an indentation 35 on the second edge 28.

Two clips 20 are supported on the first surface 16 of the first leg 12. Beneath each clip 20 is a doghouse shaped aperture 36, defined by a generally flat base edge 38 (including small depressions at each end), flat side edges 40, and a rounded peak edge 42. The flat base edge 38 of the aperture 36 is located near the midsection of the width of the first leg 12. The peak edge 42 of the aperture 36 is adjacent the first edge 26 of the first leg 12. The flat side edges 40 are generally parallel to either the third or fourth edges 30 and 32 of the first leg 12.

The clips 20 each include a riser portion 46, arm portion 48 and contact portion 50. The riser portion 46 rises from the first surface 16 adjacent the flat base edge 38 of the doghouse shaped aperture 36. The arm portion 48 extends from a top of the riser portion 46 toward the peak edge 42 of the doghouse shaped aperture 36, but terminates approximately halfway along the length of the aperture 36. The contact portion 50 includes a leading contact surface 52 and a trailing contact surface 54. The trailing contact surface 54 extends from the arm portion 48 toward the peak edge 42 of the doghouse shaped aperture 36. The leading contact surface 52 extends from an edge of the trailing contact surface 54, opposite the arm portion 48, away from the flat edge 38 of the doghouse shaped aperture 36. The relative angle between the leading contact surface 52 and trailing contact surface 54 is about 90 degrees.

Preferably, one clip 20 is located adjacent to the third edge 30 of the first leg 12 and another clip 20 is located about two thirds of the way along the length of the first leg 12 from that third edge 30.

Two second surfaces 18 are also defined by the first leg 12 and are raised above the first surface 16 of the first leg 12. The second surfaces 18 are generally square and the four edges 60 of the square are rotated approximately 45 degrees out of alignment from parallel with the edges 26, 28, 30, 32 of the generally rectangular first leg 12.

The first leg 12 defines a single doghouse shaped aperture 62 within each second surface 18. The aperture 62 is shaped similarly to the apertures 36 within the first surface 16 of the first leg 12. The aperture 62 is surrounded by a generally flat base edge 64, two flat side edges 66 and a rounded peak edge 68. The aperture 62 is rotated 45 degrees counter-clockwise out of alignment with the apertures 36 in the first surface 16. The center of the aperture 62 is located at approximately half way along the width of the first leg 12.

A single second clip 24 is supported on each second surface 18 of the first leg 12. Each clip 24 includes a riser portion 70, arm portion 72 and contact portion 74. The riser portion 70 rises from the second surface 18 adjacent the flat base edge 64 of the doghouse shaped aperture 62. The arm portion 72 extends from a top of the riser portion 70 toward the peak edge 68 of the doghouse shaped aperture 62, but terminates approximately halfway along the length of the aperture 62. The contact portion 74 includes only a leading contact surface 76. The leading contact surface 76 extends from the arm portion 72 away from the flat base edge 64 of the doghouse shaped aperture 62.

Preferably, one second clip 24 is located adjacent to the fourth edge 32 of the first leg 12. Another second clip 24 is located between the two first clips 20.

The two second clips 24 are oriented identically with respect to the first edge 26 of the first leg 12, and as such are parallel to one another. The two first clips 20 are configured closer to the first edge 26 of the first leg than the two second clips 24.

The mounting surface 22 of the second leg 14 is generally flat, but for the indentation 35 that crosses the entire height of the mounting surface 22. The mounting surface defines two holes 80 on opposite sides of the indentation 35.

Figure 3:
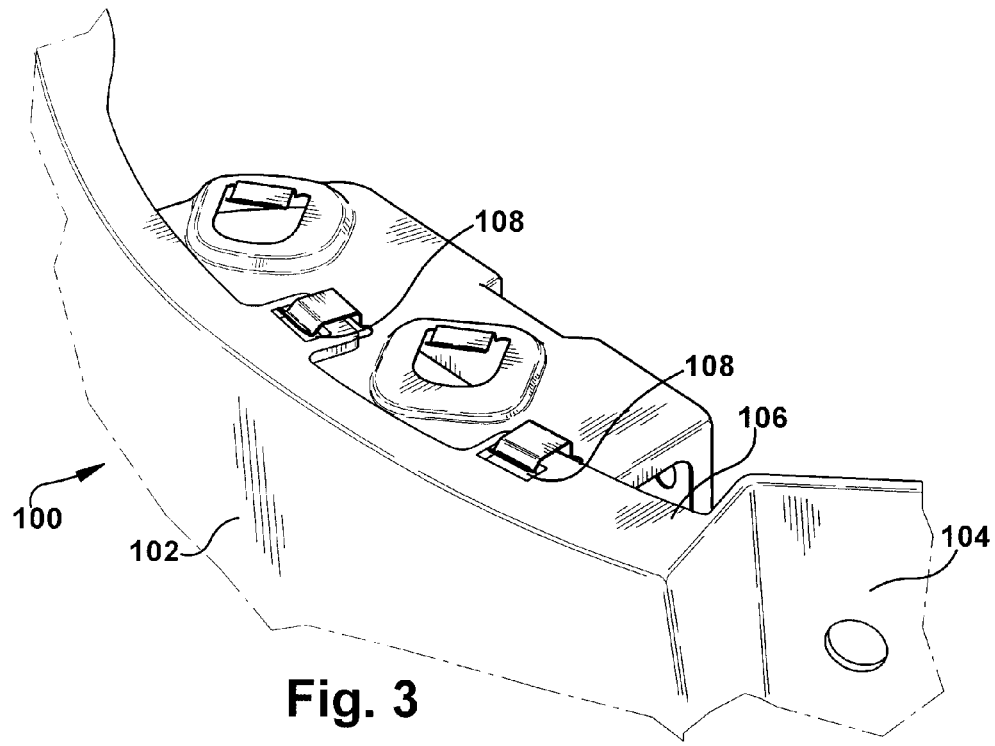
FIG. 3 is a perspective view of the bracket clipped to a vehicle bumper.

Referring to FIG. 3, a typical vehicle bumper 100 is shown including a bumper face 102, a side mounting flange 104 and a top mounting flange 106 that defines two notches 108. Referring to FIG. 4, a typical light housing 120 is shown including bulb housing 122 and two clip receptacles 124 under the bulb housing 122.

Referring to FIGS. 4-7 assembly of the bracket 10, bumper 100, and light assembly 120 is shown. First, the bracket 10 is clipped to the light housing 122 by placing the second clips 24 into the clip receptacles 124 on the light housing 122. As the leading contact 76 surface of a second clip 24 contacts an edge of a clip receptacle 124, the second clip 24 is pushed away from the second surface 18 of the bracket 10. The second clip 24 is resilient and springs back downward pushing the clip receptacle 124 tightly against the second surface 18 of the bracket 10. The light housing 122 is advanced until the clip receptacle 124 contacts the riser portion 70 of the second clip 24.

The light housing 120 is then mechanically fastened to the vehicle body (not shown) in a manner well known in the art. The bracket 16 is then mechanically fastened to the vehicle body using bolts that pass through the holes 80 in the mounting surface 22 of the second leg 14. The mounting surface 22 is pulled tightly against the vehicle body as the bolts are tightened.

The bumper 100 is then positioned on the vehicle by inserting the first clips 20 on the bracket 10 into the notches 108 on the bumper 100. The first clips 20 are positioned closer to the second edge 26 than the second clips 24, thus, allowing the first clips 20 to receive the bumper 100 without interference from the second clips 24. As the leading contact surface 52 of the first clip 20 contacts an edge of the notch 108 the first clip 20 is forced away from the first surface 16 of the bracket 10. Because the first clip 20 is resilient, the first clip 20 acts as a spring and pushes the upper mounting flange 100 of the bumper 100 tightly against the first surface 16 of the bracket 10. The bumper 100 is advanced until a valley on the contact portion 50 of the first clip 20, formed at the intersection of the leading contact face 52 and trailing contact face 54, fits into the notch 108. The bumper 100 is then mechanically fastened to the vehicle body in the position dictated by the bracket 10.

Figure 5:
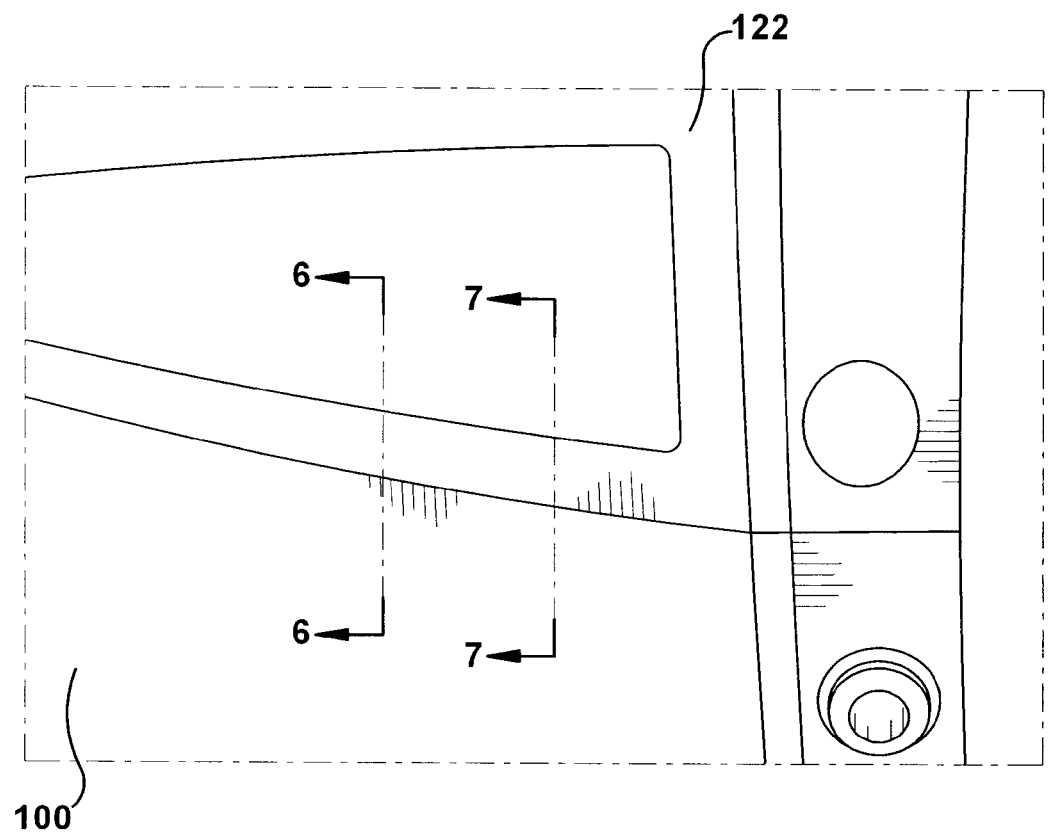
FIG. 5 is front view of a tail light housing and bumper of a vehicle.
Figure 6:
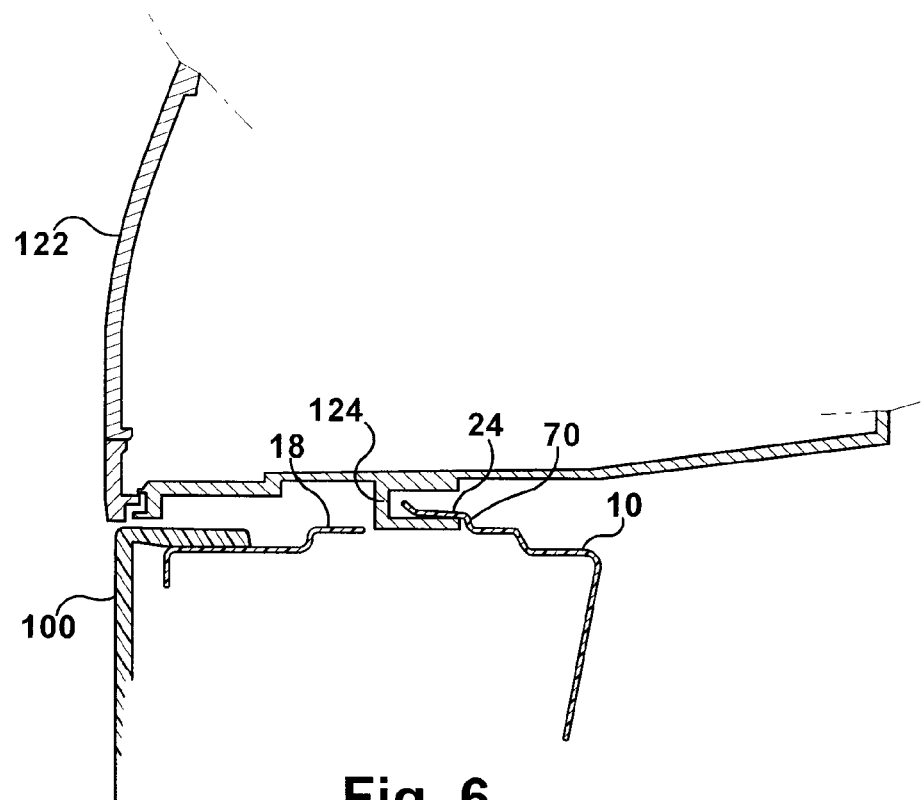
FIG. 6 is a sectional view of a tail light housing, bracket and bumper of a vehicle.
Figure 7:
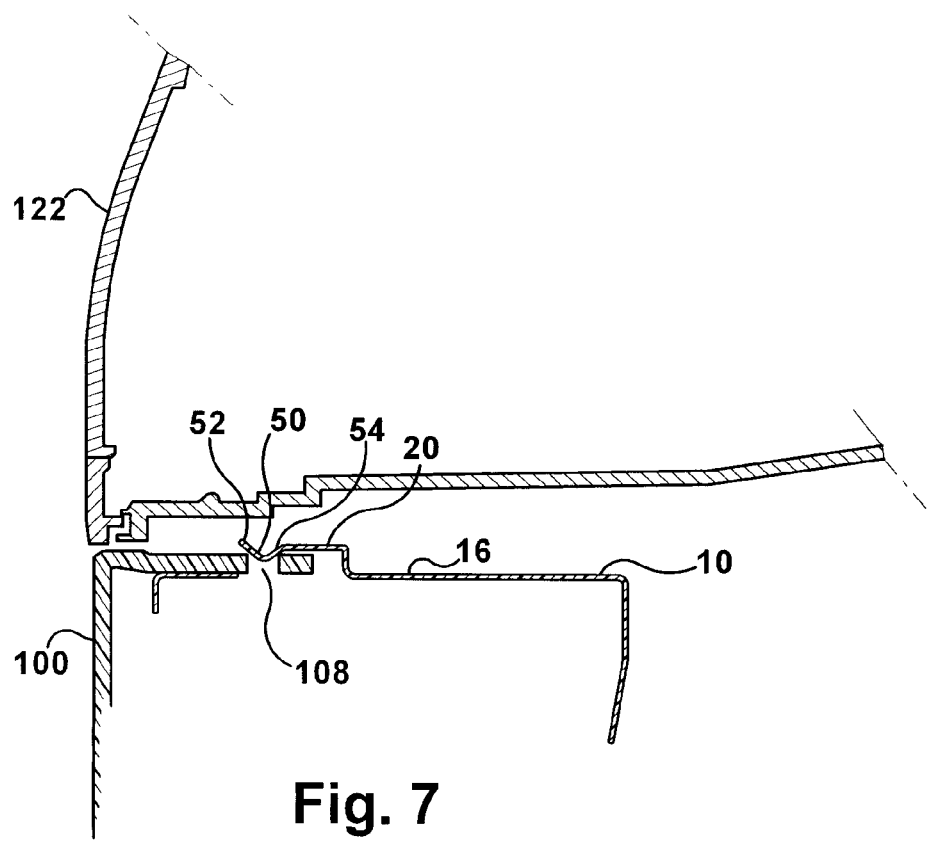
FIG. 7 is another sectional view of a tail light housing, bracket and bumper of a vehicle.

FIG. 5 shows the light housing 122 and bumper 100 assembled on the vehicle. A small, uniform gap is provided between the light housing 122 and the bumper 100. Because the light housing 122 is tightly held against the second surface 18 of the bracket 10 and the bumper 100 is tightly held against the first surface 16 of the bracket 10, the bracket 10 reliably controls the gap between the bumper 100 and light housing 122. The gap is controlled by the relative height difference between the first surface 16 and the second surfaces 18.

The light housing 122 may be easily removed from the vehicle for replacement of bulbs therein. First, the mechanical fasteners holding the light housing 122 to the vehicle are removed. Then a pulling force is applied to the light housing 122 manually or by other known means. Due to the orientation angle of the second clips 24, the light housing 122 is pulled at an angle, with respect to a directly rearward direction, during removal. Only force sufficient to overcome the spring tension caused by the second clips 24 is necessary to move the clip receptacles 124 away from the second clips 24. Once the second clips 24 are no longer inside of the clip housings 124, the light housing 122 is fully disengaged from the bracket 10. The steps described above may be reversed to re-attach the light housing 122 to the vehicle.

FIG. 3 shows the bumper 100 and bracket 10 after the light housing 122 has been removed. To remove the bumper 10 from the vehicle, the mechanical fasteners holding the bumper 100 to the vehicle are removed. Then the bumper 100 is pulled away from the vehicle in a manner well known such that the spring force of the first clips 20 is overcome. Once the first clips 20 are out of the notches 108 on the top bumper flange 106 to the bumper 100 is fully removed from the bracket 10. The steps described above may be reversed to re-attach the bumper 100 to the vehicle.

The bracket of the present invention provides an improvement over known bracket and attachment processes in that the vehicle light housing may be removed without unfastening the bumper. Further, the bracket provides first and second surfaces against which the bumper and light housing are tightly held by clips having resilient spring characteristics. As a result the bumper and light housing are uniformly spaced from each other.

Clips having alternative shapes may be used as long as the clips provide a spring force sufficient to hold the engaged part against the first or second surface of the bracket. Alternative orientations of the clips are also contemplated, for example the first clips may be rotationally offset only 15 degrees from the second clips. Different numbers of second surfaces, first clips and second clips may be used based on the size of the first bracket leg. The shape of the first leg may be varied. The shape of the second surface may be made circular or another shape.

The clip receptacles on the light housing may be replaced with receptacles of a different shape or type, for example, holes may be formed within a main body portion of the light housing. Clips of the preferred shape previously described or alternate shapes are able to fit within the holes and, thus, hold the bracket to the light housing.

The bracket is preferably a stamped metal part, but may also be an injection molded plastic part. In a plastic form, the bracket does not include apertures beneath the clips. The plastic bracket would have lips around the first, third and fourth edges of the first leg that extend further from the first leg than comparable lips on a metal bracket. Additionally, strengthening ribs extend from the first surface to the mounting surface on a plastic bracket. Optionally on a plastic bracket, a bottom surface is provided, parallel to the first surface and extending from an end of the mounting surface opposite the first surface.

Figure 8:
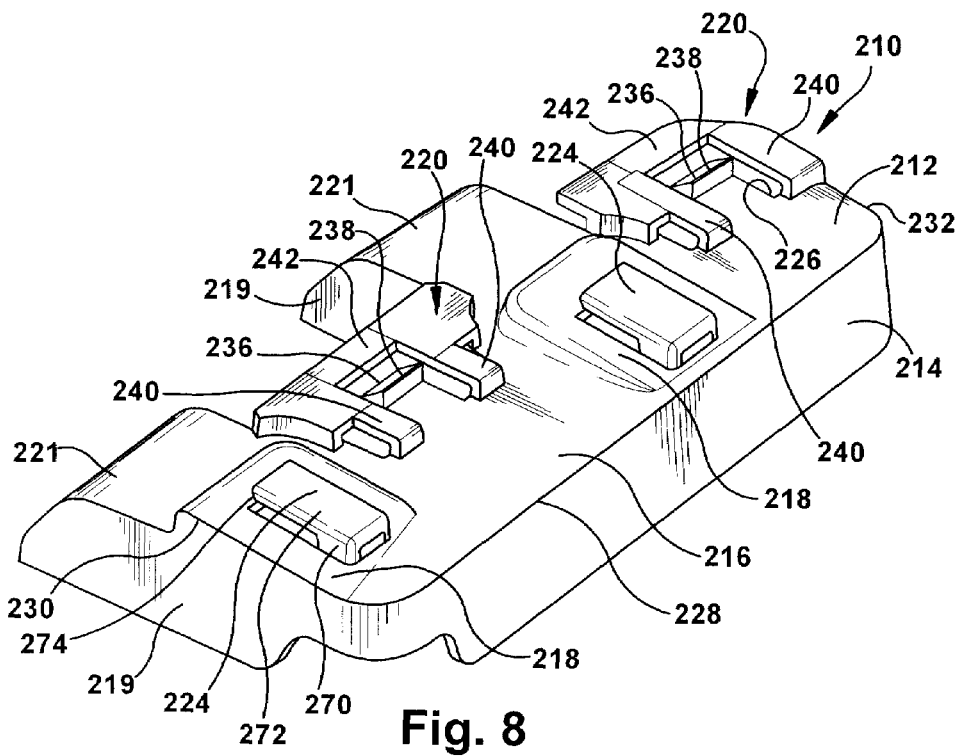
FIG. 8 is a perspective view of a second embodiment of the bracket of the present invention.
Figure 9:
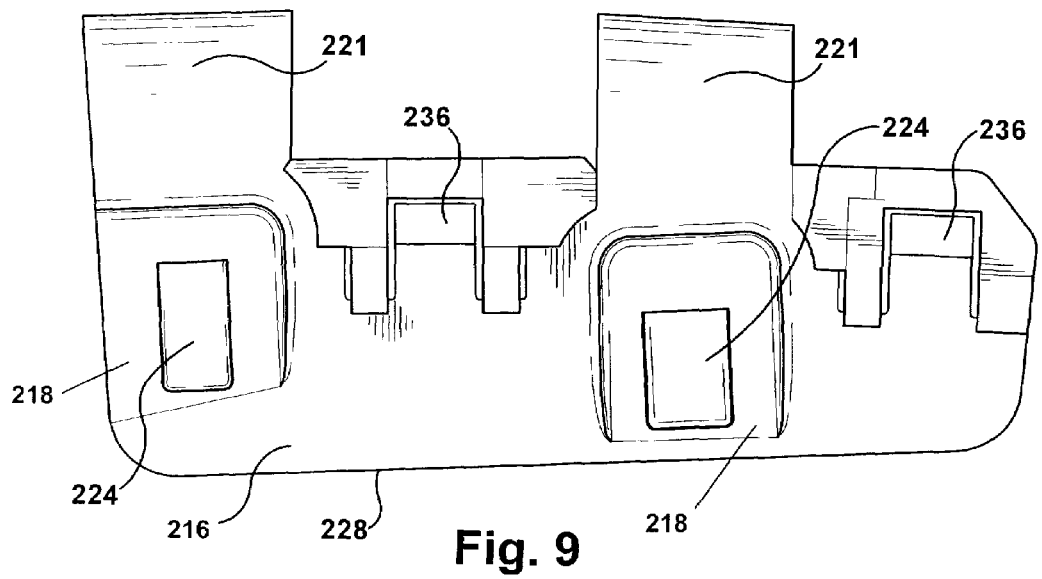
FIG. 9 is a top view of the second embodiment of the bracket.

Referring to FIGS. 8-9, in a second embodiment of the invention, the bracket 210 is not mechanically fastenable, directly, to the vehicle body. The second leg 214 of the bracket 210 is shorter than in the first embodiment and does not have apertures defined therein. The first leg 212 of the bracket 210 again has a first surface 216 and at least two second surfaces 218 that are not in the same plane as the first surface 216, each having at least a portion raised above the first surface 216. The second surfaces 218 are angled slightly with respect to the plane of the first surface 216. A hook 224 is supported on each second surface 218 of the first leg 212.

The hook 224 is similar to the clip 24 of the first embodiment in that it includes a riser portion 270, arm portion 272, however the hook 224 does not include an additional contact portion and, thus, does not clip to the tail light housing, but instead hooks onto the light housing in a manner of sliding engagement.

Instead of having a short lip surrounding the perimeter of the first surface 216, the bracket includes side surfaces 219 that have a similar height to the second leg 214. On a side of the bracket 210 opposite the second leg 214, two arcuate ramps 221 are provided, and are aligned longitudinally with the two hooks 224. The ramps 221 pitch downwardly from the level of the first surface 216 to the bottom of the side surfaces 219. Adjacent to the third edge 230 of the bracket, a side surface 219 extends from a region aligned with the first surface 216 into a region aligned with the ramps 221. On the opposite end, the length of the side surface 219 is truncated. Side surfaces 219 are also on each side of the ramps 221.

Two dual engagement clips 220 are supported on and/or are a portion of the first surface 216 of the first leg 212. Each dual engagement clip 220 includes an arm 236 extending from (and can be considered a part of) the first surface 216 and at least two braces 240 extending in an opposite direction, from a raised member 242. The arm 236 includes a riser portion 238, also referred to as a tab, that acts to secure the arm 236 to the bumper. The arm 236 itself is flexible, and resilient in a generally vertical direction. The riser portion 238 includes a beveled edge that facilitates moving the arm 236 downward, temporarily, when contacted. The braces 240 have an L-shape, and each include a short arm that rises from the first surface 216 of the first leg 212 and a long arm that extends from the short arm to the raised portion 242. The braces 240, raised portion 242 and a section of the first edge 226 of the first leg 212, define a window into which both the tab 238 of the arm 236 and a portion of the bumper 100 are placed into, as later described.

One dual engagement clip 220 is located adjacent to the fourth edge 232 of the first leg 212 and another dual engagement clip 220 is located about two thirds of the way along the length of the first leg 212 from that fourth edge 232. Preferably, a hook 224 is located adjacent to the third edge 230 of the first leg 212. Another hook 224 is located between the two dual engagement clips 220.

The raised second surfaces 218 and hooks 224 supported thereon are shown as being almost parallel to the second edge 228 of the bracket, but in fact may be configured at any angle to this edge 228.

Figure 10:
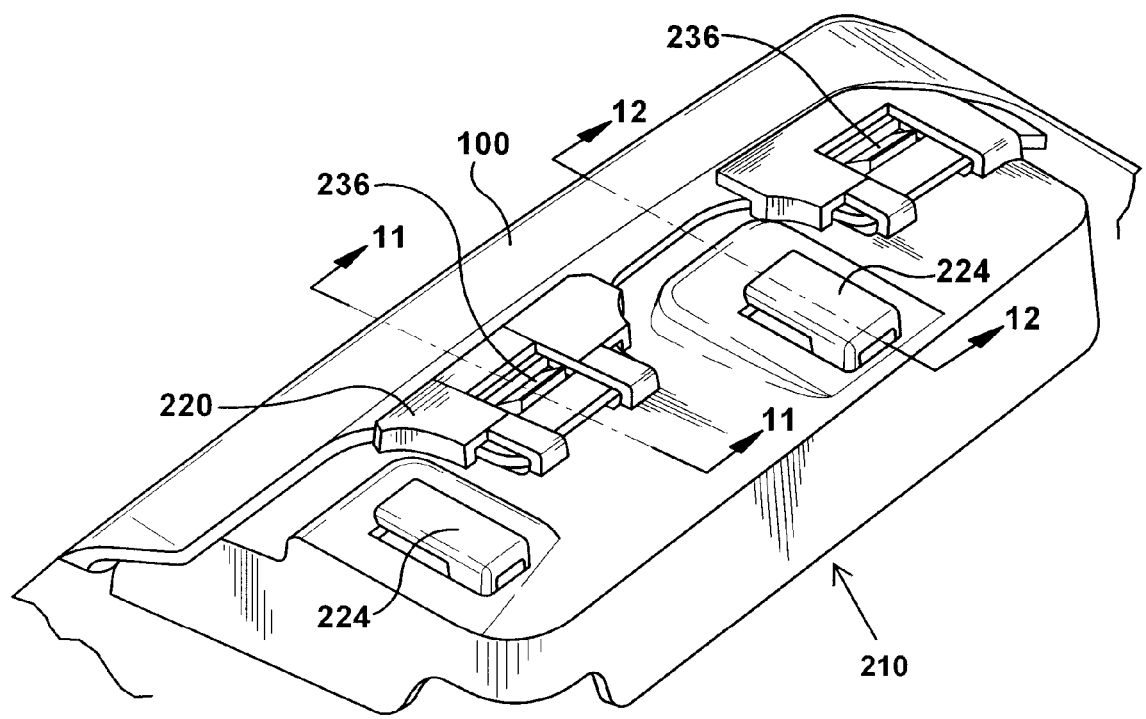
FIG. 10 is a perspective view of a portion of the bumper and a second embodiment of the bracket.
Figure 11:
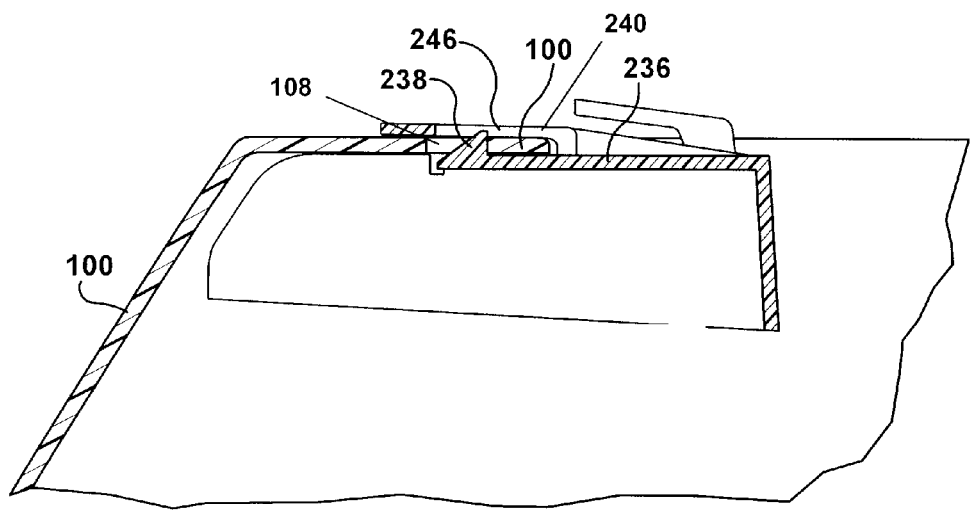
FIG. 11 is a sectional view of a bumper and a second embodiment of the bracket.
Figure 12:
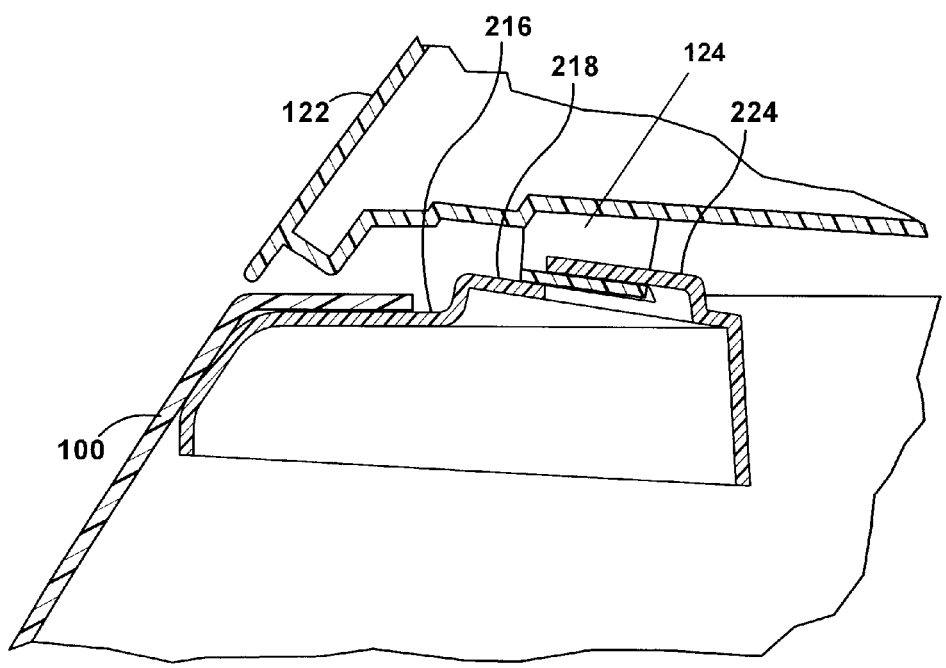
FIG. 12 is a sectional view of a tail light housing, second embodiment of the bracket and bumper of a vehicle.

FIGS. 10-12 show how each dual engagement clip 220 connects to the bumper 100, which is the first step of assembly of the bumper and light housing to the vehicle. The bumper 100 is held both by the riser portion 238 and the braces 240 of the dual engagement clip 220. The bumper 100 is then positioned on the vehicle and fastened thereto in a manner known in the art. The bracket 210, although being attached to the bumper 100, is not fastened directly to the vehicle body. The bracket 210 is then engaged with the light housing 122 by sliding the clip (hook) receptacles 124 on the light housing 122 over the hooks 224 on the bracket 210. The light housing 122 is then mechanically fastened to the vehicle body in a manner well known in the art in the position dictated by the bracket 210. As a result of this method, the bracket controls the gap between the bumper and light housing as well as the fit and finish.

Again, the light housing 122 may be easily removed from the vehicle for replacement of bulbs therein. The mechanical fasteners holding the light housing to the vehicle are first removed. A pulling force is then applied to the light housing. The light housing slides easily off of the hooks 224. Once the hooks 224 are no longer inside of the clip/hook housings 124, the light housing 122 is fully disengaged from the bracket 210. These steps are reversed to re-attach the light housing to the vehicle. The ramps 221 help guide the light housing 122 into the correct position to engage the hooks 224.

When removing the bumper, the light housing must first be removed as described above. Then the screws or bolts holding the bumper to the vehicle are removed and both the bumper 100 and bracket 210 are removed together.

Although the invention has been shown and described with reference to certain preferred and alternate embodiments, the invention is not limited to these specific embodiments. Minor variations and insubstantial differences in the various combinations of materials and methods of application may occur to those of ordinary skill in the art while remaining within the scope of the invention as claimed and equivalents.

What is claimed is:

1. A bracket for controlling the gap between a light housing and bumper on a vehicle, the bracket comprising:
    a first generally flat surface defined by a first bracket leg;
    a series of second surfaces defined by the first bracket leg, each second surface including at least a portion raised above the first surface;
    one or more clips supported on the first surface of the first bracket leg to clip a vehicle bumper to the bracket, each clip including at least one brace member that engages an outer edge of the bumper and a tab member that engages an edge of a notch defined within the bumper, the brace and tab members working together to secure the bracket to the bumper; and
    one or more hooks each supported on a second surface of the first bracket leg allowing sliding engagement between a light housing and the bracket.

2. The bracket of claim 1, wherein the second surfaces are generally flat.

3. The bracket of claim 1, wherein the first leg defines at least one ramp surface that extends arcuately downward from the first flat surface at an edge of the bracket that is adapted to engage the bumper.

4. The bracket of claim 1 wherein the first leg is integrally formed with a second leg and is generally perpendicular to the second leg.

5. The bracket of claim 1 wherein the tab member is a portion of a resiliently deflectable arm.

6. The bracket of claim 1, wherein the hooks each comprise a riser portion and an arm portion transverse to the riser portion.

7. A tail light bracket assembly for a vehicle, the assembly comprising:
    a light housing including a plurality of hook receptacles;
    a vehicle bumper defining a plurality of notches; and
    a bracket including:
        a first generally flat surface defined by a first bracket leg;
        a series of second surfaces defined by the first bracket leg and each including at least a portion raised above the first surface;
        one or more clips supported on the first surface of the first bracket leg to clip a vehicle bumper to the bracket, each clip including at least one brace member that engages an outer edge of the bumper and a tab member that engages an edge of a notch defined within the bumper, the brace and tab members working together to secure the bracket to the bumper;
        one or more hooks supported by the second surfaces allowing sliding engagement between the light housing and the bracket.

8. The tail light bracket assembly of claim 7, wherein the light housing may be engaged and disengaged from the bracket solely by the application of force to the light housing.

9. A method for controlling the gap between a tail light housing and bumper on a vehicle comprising the steps of:
    clipping a bracket to the bumper, the bracket including:
        a first generally flat surface defined by a first bracket leg;
        a series of second surfaces defined by the first bracket leg and having at least a portion raised above the first surface;
        one or more first clips including a resiliently deflectable tab and static brace supported on the first surface of the first bracket leg to engage the vehicle bumper with the bracket;
        one or more hooks each supported on a second surface of the first bracket leg to slidingly engage a light housing with the bracket;
    mechanically fastening the bumper housing to the vehicle;
    engaging the light housing with the hooks on the bracket; and mechanically fastening the light housing to the vehicle.

* * * * *